Sept. 20, 1932.  S. N. BUCHANAN  1,878,754
PIPE BENDER
Filed Oct. 1, 1930    3 Sheets-Sheet 1
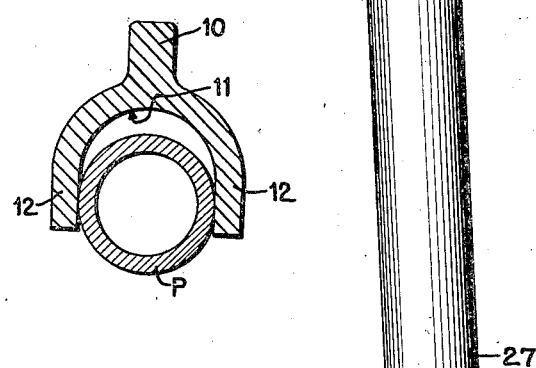
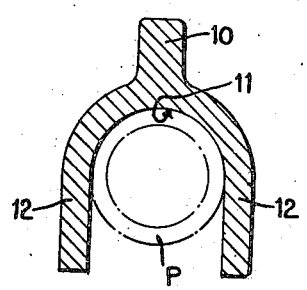
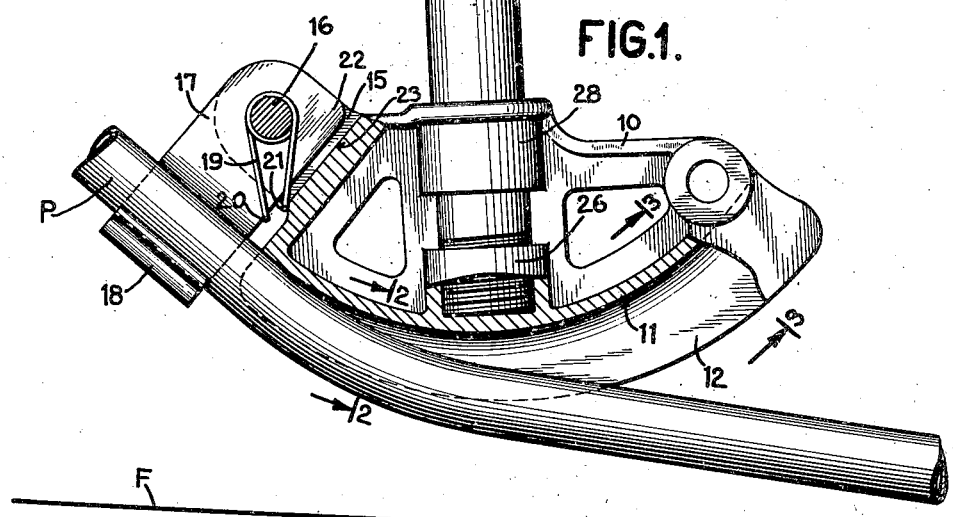
Inventor
STEPHEN N. BUCHANAN
By Attorney
John M. Montstream

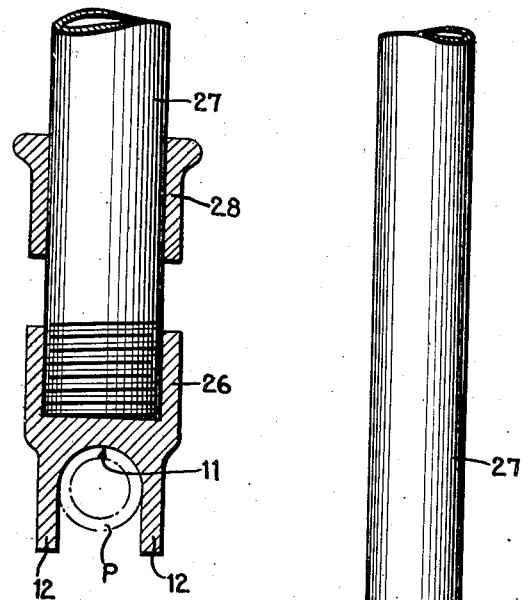
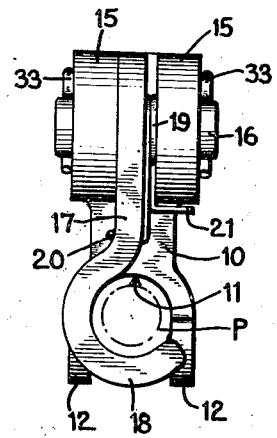
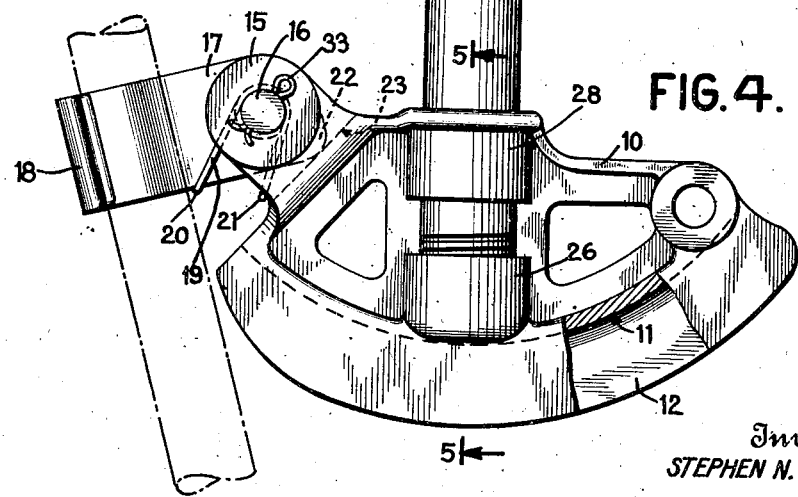

Sept. 20, 1932.   S. N. BUCHANAN   1,878,754
PIPE BENDER
Filed Oct. 1, 1930    3 Sheets-Sheet 3

Inventor
STEPHEN N. BUCHANAN
By   Attorney
John M. Montstream

Patented Sept. 20, 1932

1,878,754

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

PIPE BENDER

Application filed October 1, 1930. Serial No. 485,594.

This invention relates to pipe benders which provide an arcuate form corresponding substantially with the arc through which a pipe is to be bent and having pipe holding means at one end of the arcuate form for holding the pipe in contact with the form while the pipe is being bent thereupon.

The pipe holding means ordinarily takes the form of a pivoted hook which is first swung away from the arcuate form in order to insert a pipe in position for bending and is then swung towards the arcuate form in order to clamp or hold the pipe in position against the form for bending. This pipe securing means as heretofore known must be manually pivoted away from the form before a pipe could be inserted upon the pipe bender.

In bending a pipe upon the arcuate form of the bender, there is a tendency to flatten the pipe as it is bent about the form. The arcuate form has therefore been provided with sides forming a groove substantially the width of the pipe to be bent so that during the bending operation, the sides of the pipe are supported by the sides of the groove and flattening of the pipe is largely resisted thereby. The grooves on some pipe benders have a depth equal to the pipe diameter. It has been found, however, that the actual bending of the pipe does not entirely occur at the point where the pipe contacts with the arcuate form but some initial bending occurs several inches distant therefrom. Flattening of the pipe frequently begins, therefore, outside of the groove so that the side walls of the groove cannot support the sides of the pipe and prevent flattening thereof at least for the initial bending.

The handle by which the bender is rocked to bend pipe is a pipe several feet long and is threaded into a socket in the bender. The length of the handle necessarily provides large leverage and the force applied at the end of the handle is magnified many times at the threaded socket of the handle in the bender. The threading of the end of the pipe handle also weakens the handle so that this weakening with the great force which the handle must transmit to the bender causes the handle to break off at the end of the threads.

It is an object of this invention to provide pipe holding means which returns to pipe inserting position away from the arcuate form as soon as the pipe holding means is released from a pipe which has been bent upon the bender.

Another object of the invention is to provide a groove to support the sides of a pipe to be bent upon the arcuate pipe bending form which groove is substantially greater in depth than the diameter of the pipe.

Another object of the invention is to provide a pipe bender in which the arcuate groove upon which the pipe is bent has an increasing depth from one end to the other with the minimum depth being adjacent to the pipe holding or securing means.

A still further object of the invention is to provide a pipe bender in which the pipe bender handle is supported by a means spaced from the socket or other means which receives the end of the pipe bending handle.

Other objects of the invention will be more apparent from the following description taken in connection with the accompanying drawings in which:

Figure 1 shows a pipe bender having an arcuate groove which increases in depth from one end to the other, the minimum depth of groove being at the end having a pipe securing means which is also shown.

Figure 2 is an enlarged section through the pipe bender taken on line 2—2 of Figure 1.

Figure 3 is an enlarged section through the groove of the pipe bender taken on line 3—3 of Figure 1.

Figure 4 shows a pipe bender having an arcuate groove which is uniform in depth but the depth of the groove is substantially greater than the diameter of the pipe to be bent.

Figure 5 is a section of the pipe bender taken on line 5—5 of Figure 4.

Figure 6 shows the position of the pipe securing means at the end of and with respect to the groove with a pipe secured therein as viewed from the end of the pipe securing means.

Figure 7:
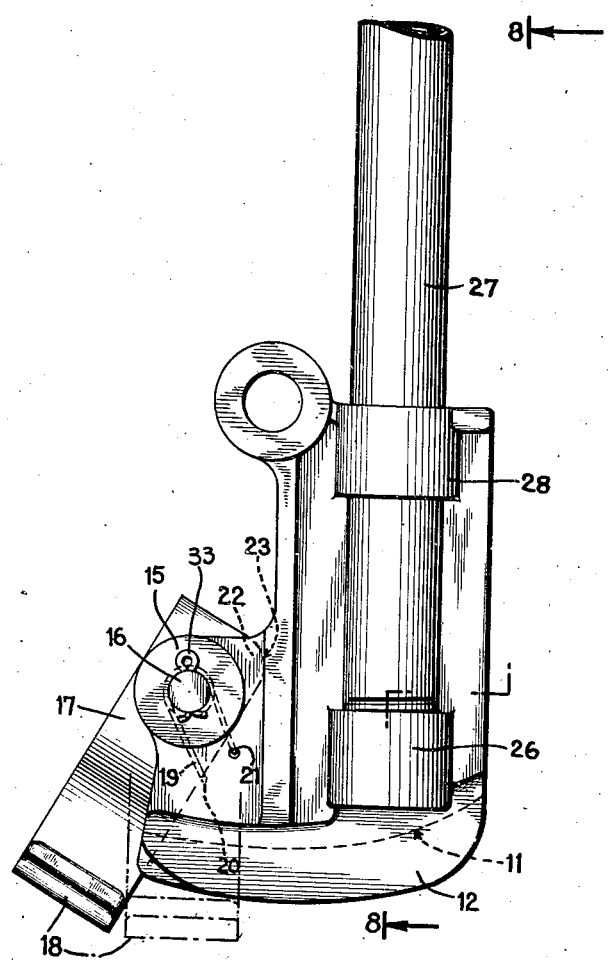
Figure 7 shows a pipe bender suitable for bending thick walled pipe and in which the depth of the groove is substantially less than the diameter of the pipe.

Th pipe bender consists of a frame 10 having an arcuate form 11 with side walls 12 forming an arcuate groove within which the pipe P is bent. The side walls 12 of the arcuate groove are of increasing depth beginning from the end carrying the pipe securing means. In the preferred construction the depth of the arcuate groove adjacent to the pipe securing means is approximately one quarter less than the pipe diameter and the depth of the groove increases so that at the other end the arcuate groove has a depth approximately one and one-half times the diameter of the pipe P. These proportions in the depth of the groove are not fixed but may vary through a wide range, the important element being that the groove has side flanges which are greater in height or the groove is greater in depth than the pipe diameter at points distant from the pipe securing means. This construction enables a pipe bender to be as light in weight as possible and yet conform to the invention.

In bending a length of pipe with a tool, such as that described herein, it has been found that the pipe begins to bend some distance from the point where the pipe contacts with the arcuate form as the pipe is being bent thereupon and, consequently, the bending frequently begins outside of the groove so that the groove cannot offer any support to the pipe during this initial bending and prevent its flattening. It is for this reason that the pipe bender is provided with a groove whose depth increases from one end of the groove to the other or which provides a groove having cam-shaped side walls. The groove may also be said to have an arcuate form 11 taken upon the arc of a circle and the outer edge of the side walls 12 are taken upon the arc of a second circle whose center is spaced from the center of the first circle.

In this construction the side walls of the deep groove offer support against flattening of the pipe even though the pipe is not contacting with the bottom of the groove at the point where some bending is taking place. It is immaterial therefore that some actual bending of the pipe occurs some distance from the point where the pipe contacts with the arcuate form since the side walls of the groove project outwardly far enough to support the sides of the pipe at the point where the pipe begins to bend.

The frame 10 of the pipe bender is provided at one end with a pair of lugs 15 which carry a pivot 16. A pipe securing member 17 is pivoted between the lugs 15 and upon the pivot 16. The pipe securing means may be a hook 18 carried by the member 17 and engages the underside of the pipe P. A spring 19 keeps the hook 18 or pipe securing means in pipe inserting position away from the end of the groove or arcuate form 11 which is better shown in Figure 4. The spring 19 may take any desired form and the spring shown in Figure 1 is wrapped around the pivot 16 and has one end 20 engaging the side of the pipe securing member 17 and the other end 21 engaging the frame 10. A stop 22 is provided upon the pipe securing member 17 which engages the stop face 23 on the frame 10 thereby limiting the extent of pivotal movement of the pipe securing means.

The frame 10 carries a threaded socket 26 or pipe receiving means for inserting the threaded end of a handle 27. The frame 10 also carries a support bracket or bearing 28 spaced above the socket 26 through which the handle 27 projects and provides additional support for the handle 27.

The pipe benders described herein may be used to bend pipe by inserting the pipe in the pipe securing means and the groove providing the arcuate form as the piece of pipe P lies upon the floor. The operator then grips and pulls upon the handle 27 to rock the bender with respect to the pipe and bears down upon the tool to keep it upon the floor. Where the pipe bender is used in this manner, the edges of the side walls 12 of the groove may serve as rolling surfaces as the pipe is bent.

In bending a piece of pipe it is difficult to keep the bender in contact with the floor and usually the force exerted in bending the pipe lifts the bender completely off the floor somewhat as shown in Figure 1. The actual bending of the pipe therefore usually first begins at a point some inches from the point where the pipe is at the moment contacting with the arcuate groove which in the pipe benders heretofore known is outside of the influence of the side walls 12. Frequently then the pipe is not supported against flattening by the side walls of the groove at least for this initial bending. The increased depth of groove or the groove having increased height of side walls 12 enables the pipe to be supported against flattening even though the pipe bender does not remain in contact with the floor F and the initial bending of the pipe P begins some distance from the point where the pipe contacts with the arcuate form 11 as it is being bent.

In the construction shown in Figure 4, the side walls 12 of the arcuate groove 11 are of substantially uniform height, or to express this relation in different words, the pipe bending groove is of substantially the same depth from one end to the other end of the arcuate form 11. This groove is, however, substantially greater in depth than the diameter of the pipe P to be bent thereby. In other respects, the pipe bender of Figure 4 is substantially the same as that shown in Figure 1. In this construction the depth of groove or the height of the side walls 12 is sufficient to support the pipe as it is bent even though the pipe bender cannot be kept upon the floor with the consequent initial bending of the pipe taking place some distance from the point of contact of the pipe with the arcuate form 11. The bender shown in Figure 4 can be expected to be heavier than the form shown in Figure 1. The groove in this style of pipe bender is substantially greater in depth than the diameter of the pipe throughout the length of the groove whereas in the bender of Figure 1, only the portion of the groove distant from the pipe securing means is so proportioned or where it is particularly needed.

The lugs 15 carrying a pivot 16 retained therein by a cotter pin 33 upon which pivot the pipe securing means 17, 18 is mounted and the spring 19, 20. 21 to keep the pipe securing means in released position away from the groove, are duplicates of the corresponding structure shown in Figure 1. This construction will not be again described.

Figure 8:
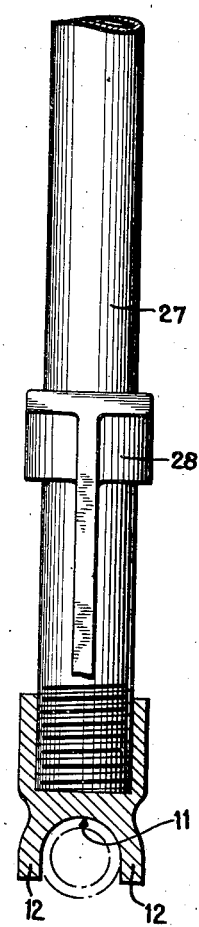
Figure 8 is a partial section of the pipe bender of Figure 7 taken on line 8—8.

The pipe benders described and illustrated in Figures 1 through 6 are adapted principally for the bending of thin walled pipe. The pipe bender shown in Figures 7 through 8 is for bending thick walled pipe which is relatively more difficult to bend. For bending thick walled pipes, the arcuate form 11 is shorter in extent than the form or groove for bending thin walled pipe. In order to bend a thick walled pipe through a long radius of curvature, it must be bent as much as possible along the short arcuate form 11 and then moved to a new position and again bent and repeating this process until the required curvature is obtained. Thick walled pipe does not flatten as easily as thin walled and therefore the support of the side walls 12 is not as necessary to prevent flattening of the pipe. The side walls 12 in this embodiment of the invention is approximately three quarters of the pipe diameter in height which offers sufficient support for a thick walled pipe as it is bent. In other respects the pipe bender is substantially the same as the thin walled pipe bender in having the spring retracted pipe securing means and handle support, excepting that the handle support 28 is positioned at a greater distance from the threaded socket 26 thereby affording increased support for the handle 27 and the pipe securing hook 18 extends over the groove in pipe securing position.

The invention described herein may take various forms some of which have been described and illustrated in the drawings. Other forms may be constructed and the invention contemplates all forms within the scope of the invention.

What is claimed is:

1. A pipe bender having an arcuate form substantially of the radius of the bend to be formed and along which arcuate form a pipe is bent, side walls for the arcuate form providing an arcuate groove, the side walls of the groove being arcuate throughout the length of the groove and increasing in height from one end to the other resulting in a groove of increasing depth, pipe securing means at the end of the arcuate groove having the minimum depth, and a handle to exert bending force upon the pipe to be bent.

2. A pipe bender having an arcuate form substantially of the radius of the bend to be formed and along which arcuate form a pipe is bent, side walls for the arcuate form providing an arcuate groove, the side walls of the groove being arcuate throughout the length of the groove and increasing in height from one end to the other resulting in a groove of increasing depth, pipe securing means at the end of the arcuate groove having the minimum depth, the groove at the end distant from the pipe securing means having a depth substantially greater than the diameter of the pipe, and a handle to exert bending force upon the pipe to be bent.

3. A pipe bender having an arcuate form substantially of the radius of the bend to be formed and along which arcuate form a pipe is bent, side walls for the arcuate form providing an arcuate groove, the side walls of the groove being arcuate throughout the length of the groove and being less in height than the pipe diameter at one end and increasing to a height substantially greater than the pipe diameter at the other end, pipe securing means at the end of the arcuate groove having the minimum depth, and a handle to exert bending force upon the pipe to be bent.

4. A pipe bender having an arcuate form substantially of the radius of the bend to be formed and along which arcuate form a pipe is bent, side walls for the arcuate form providing an arcuate groove, the outer edge of the side walls being formed on the arc of a circle having a center spaced from the center of the arcuate form providing a groove of increasing depth from one end to the other end, pipe securing means at the end of the arcuate groove having the minimum depth, the groove at the end distant from the pipe securing means having a depth substantially greater than the diameter of the pipe, and a handle to exert bending force upon the pipe to be bent.

5. A pipe bender having an arcuate form substantially of the radius of the bend to be formed and along which arcuate form a pipe is bent, the arcuate form having a substantial length, side walls for the arcuate form providing an arcuate groove, the side walls of the groove being substantially greater in height substantially the entire length of the groove than the diameter of the pipe to be bent in the groove, pipe securing means at one end of the arcuate groove, and a handle to exert bending force upon the pipe to be bent.

6. A pipe bender comprising an arcuate groove along which a pipe is bent, a handle to exert bending force upon the pipe, a pipe securing means at one end of the arcuate groove and movable away from the groove to pipe inserting position, and means to retain the pipe securing means in pipe inserting position prior to the insertion of a pipe therein.

7. A pipe bender comprising an arcuate groove along which a pipe is bent, a handle secured to the bender to exert bending force upon the pipe, a pivoted pipe securing means at one end of the arcuate groove, and resilient means to hold the pipe securing means away from the arcuate groove in pipe inserting position.

8. A pipe bender comprising an arcuate groove within which a pipe is bent, a handle to exert bending force upon the pipe, a pivoted pipe securing means at one end of the arcuate groove, and a spring engaging the pipe securing means and holding it in pipe inserting position away from the arcuate groove.

9. A pipe bender comprising an arcuate groove within which a pipe is bent, pipe securing means at one end of the arcuate groove, a handle for the bender, means to rigidly secure the end of the handle to the bender to exert force in bending a pipe, and rigid handle supporting means spaced at a substantial distance from the securing means to provide additional rigid support for the handle.

10. A pipe bender comprising an arcuate groove within which a pipe is bent, pipe securing means at one end of the arcuate groove, a handle having a threaded end for the bender to exert force in bending the pipe, a threaded socket carried by the bender to secure the end of the handle thereto, and a supporting bushing spaced at a substantial distance from the handle receiving means through which the handle passes.

11. A pipe bender comprising an arcuate groove upon which a pipe is bent, a handle secured to the bender to exert bending force upon the pipe, a pivoted pipe securing means at one end of the arcuate groove, resilient means to hold the pipe securing means away from the arcuate groove in pipe inserting position, and stop means to limit the extent of movement of the pipe securing means away from the arcuate groove.

12. A pipe bender comprising an arcuate groove upon which a pipe is bent, a handle secured to the bender to exert bending force upon the pipe, a pivoted pipe securing means at one end of the arcuate groove, resilient means to hold the pipe securing means away from the arcuate groove in pipe inserting position, and stop means carried by the pipe securing means to limit the extent of movement of the pipe securing means away from the arcuate groove.

13. A pipe bender comprising an arcuate groove having a substantial arc of curvature within which groove a pipe is bent, pipe securing means at one end of the arcuate groove, a handle for the bender, a socket adjacent the arcuate groove to receive the handle, and a rigid handle supporting means spaced at a substantial distance from the socket to provide additional rigid support for the handle.

In testimony whereof I affix my signature.

STEPHEN N. BUCHANAN.